April 23, 1968  S. BERGLUND ET AL  3,379,053
MEANS FOR MEASURING MECHANICAL STRESSES IN
MAGNETO-STRICTIVE MATERIAL
Filed March 24, 1966  2 Sheets-Sheet 1
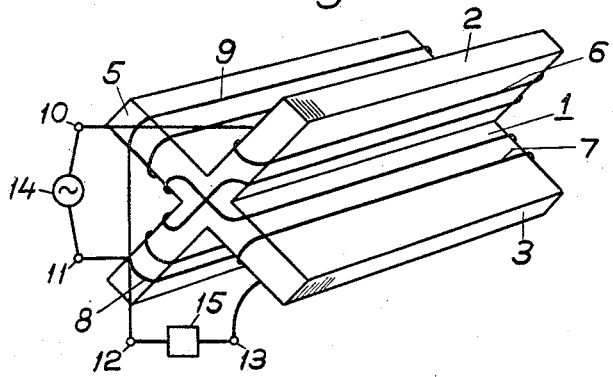
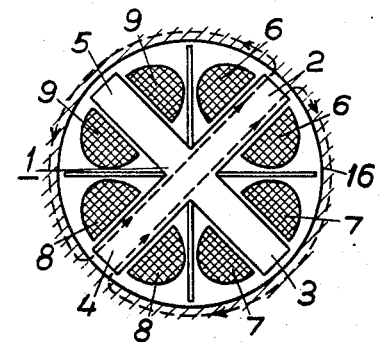
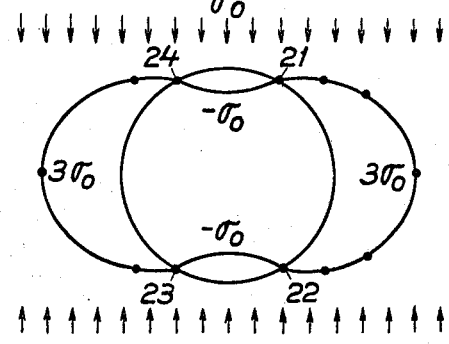
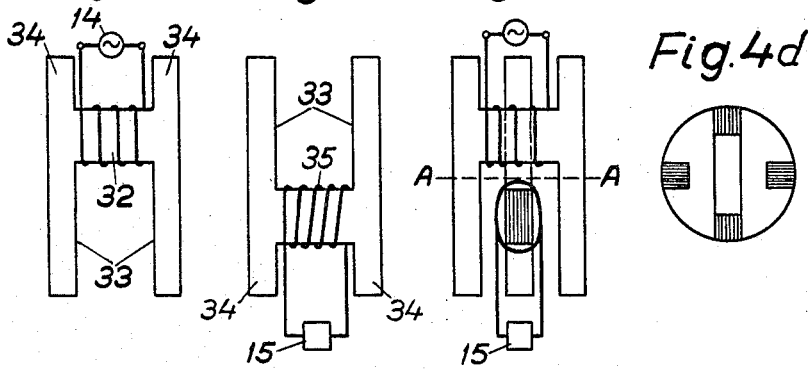
INVENTORS
STEN BERGLUND
ORVAR DAHLE
BY
ATTORNEYS April 23, 1968     S. BERGLUND ET AL     3,379,053
MEANS FOR MEASURING MECHANICAL STRESSES IN
MAGNETO-STRICTIVE MATERIAL Filed March 24, 1966                         2 Sheets-Sheet 2

INVENTOR.
STEN BERGLUND
BY ORVAR DAHLE
Jennings Bailey

United States Patent Office 3,379,053
Patented Apr. 23, 1968

3,379,053
MEANS FOR MEASURING MECHANICAL STRESSES IN MAGNETO-STRICTIVE MATERIAL
Sten Berglund and Orvar Dahle, Vasteras, Sweden, assignors to Allmänna Svenska Elektriska Aktiebolaget, Vasteras, Sweden, a Swedish corporation
Filed Mar. 24, 1966, Ser. No. 537,091
Claims priority, application Sweden, Mar. 25, 1965, 3,848/65
9 Claims. (Cl. 73—88.5)

ABSTRACT OF THE DISCLOSURE

A transducer for determining mechanical stresses in magneto-strictive material, the transducer consists of a core which is formed as a cross and at least one of the two cross arms passing in the same direction is provided with an exciting coil while at least one of the remaining cross arms is provided with a measuring coil. The transducer is placed in a bore which is perpendicular to the stress direction and generates a substantially homogeneous magnetic flux in the surface of the bore which magnetic flux is substantially at right angles to the longitudinal direction of the bore. The transducer indicates the magnetic potential difference caused by the mechanical stresses in the material between two zones in the wall of the bore.

Figure 2A:
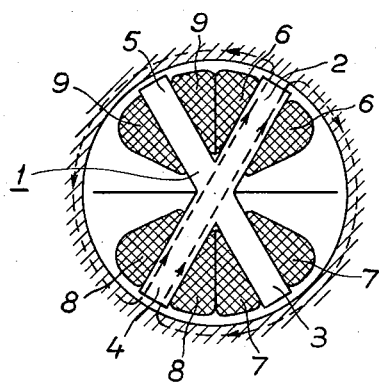

It is known that mechanical stresses in magneto-strictive material can be measured by generating an inhomogeneous magnetic flux in the surface of the material by means of a magnet system and that by means of a coil system the changes of the magnetic flux which occur when the material is subjected to mechanical force can be indicated. The indication is carried out at two symmetrically situated points in the inhomogeneous magnetic flux and the inhomogeneity of the flux is a condition precedent carrying out the measuring.

A transducer has been proposed in order to measure mechanical stresses inside a magneto-strictive material, which transducer operates on principally the same system with an inhomogeneous magnetic flux. The transducer is inserted into a cylindrical bore in the material and by means of two exciting coils with completely separated iron cores the inhomogeneous magnetic flux is generated in the walls of the bore. The deformation of the magnetic flux which occurs when the material is subjected to mechanical force is indicated by iron cores provided with windings which are arranged symmetrically in relation to the flux generating coil system and in a plane at right angles to the plane through this coil system. In order to obtain the greatest possible sensitivity in the transducer, it is placed so that the cores and coils lie substantially at right angles to the mechanical stresses. Thereby the known force distribution which occurs round a circular bore in a material which is subjected to a unilateral mechanical stress is used. If the material is subjected to a mechanical stress $\sigma_0$ the stress becomes $=3\sigma_0$ in the bore edge in the two diametrically opposite points whose connecting line is at right angles to the stress direction.

The present invention relates to a transducer for determining mechanical stresses in magneto-strictive material and intended to be placed in a preferably circular bore in the magneto-strictive material at right angles to the stress direction. The transducer comprises partly a magnetizing device connected to an A.C. source and partly an indicating device connected to a measuring or indicating device. The invention is characterised in that the magnetizing device is placed diametrically in the bore and arranged so that a substantially homogeneous magnetic flux is generated in the bore wall, which flux is substantially at right angles to the longitudinal direction of the bore and so that the indication device is arranged to indicate the magnetic potential difference caused by the mechanical stresses in the material between two zones in the bore wall which are substantially diametrically opposite each other and parallel to the longitudinal direction of the bore. The magnetizing device as well as the indicating device consists of a core of magnetic material and at least one winding arranged on it. The two cores can be separated or can be a single unit. The cores are arranged preferably diametrically in the bore and form an angle with each other. This angle is preferably 90° but can also have other sizes, for example 60°. If the cores are joined to form one unit, this is suitably formed as a cross with the windings arranged on the cross arms. If the cores are, however, separated, they are suitably formed as an H with the winding arranged on the horizontal part.

With a transducer according to the invention, not merely the effect mentioned in the introduction is used where a mechanical stress $\sigma_0$ in a material causes a tangential stress $=\sigma 3_0$ in the edge of a circular bore in the material in the two diametrically opposite points, whose connection line is at right angles to the stress direction, but also the effect where in the two diametrically opposite points whose connection line is parallel to the stress direction the mechanical tangential stress $=-\sigma_0$. This will be explained more fully later on in the description.

In the accompanying drawing, FIG. 1 shows a perspective views and FIGS. 2 and 2a end views of two modifications of a transducer according to the invention. FIG. 3 shows the distribution of the mechanical stress in the edge of a cylindrical bore in a material which is subjected to a one-sided stress $=\sigma_0$. FIG. 4 shows another embodiment of the transducer.

The transducer shown in FIGS. 1 and 2 has a core 1 of magnetic material. The core is formed like a cross with four arms 2, 3, 4 and 5, which are suitably of equal length and which are at right angles to each other. On each of the two arms 2 and 4 is arranged an exciting coil 6 and 8. The two coils are series connected and turned so that the magnetic fluxes in the two arms have the same direction, which is shown by the broken lines on FIG. 2. The coils at 10 and 11 are connected to an A.C. source 14. Each of the two other arms 3 and 5 is provided with a measuring coil 7 and 9, which are series connected and at 12 and 13 are connected to a measuring device known per se which is designated by 15.

In FIG. 2 the transducer is shown inserted in a circular bore 16 in a magneto-strictive material. The core is formed so that the least possible air gap is obtained between the core and the surface of the bore in order that the air gap reluctances shall be as small as possible. When a current passes through the coils 6 and 8 in a certain direction, the generated magnetic flux will be directed straight up to the right, as shown by the arrows on the arms 2 and 4. When the flux enters the magneto-strictive material, it divides to the right and to the left, passes on the surface of the bore 16 and goes into the cross arm 4 down to the left. If the magneto-strictive material is isotropic and not subjected to mechanical stresses, the magnetic potential difference is zero between the two areas on the surface of the bore which are situated at the free ends of the cross arms 3 and 5. No magnetic flux therefore passes through these two arms and no voltage is induced in the coils 7 and 9.

If, on the other hand, the magneto-strictive material is subjected to a mechanical stress $\sigma_0$ as shown in FIG. 3, mechanical tangential stresses $\sigma_t$ will occur in the surface of the bore. The size and designation of the stresses will vary according to the formula $\sigma_t = \sigma_0(1 - 2\cos 2\rho)$.

In the formula $\rho$ is the angle between the $\sigma_0$ direction of the stress and the direction from the centre point of the bore to the point on the surface of the bore where it is desired to determine $\sigma_t$, in FIG. 3 the curve 20 shows how $\sigma_t$ varies round the bore. The characteristic value on $\sigma_t$ is obtained for $\rho = 0°$, 30° and 90°. If $\rho$ is 0°, $\sigma_t = -\sigma_0$. For $\rho = 30°$, $\sigma_t = 0$ and for $\rho = 90°$ $\sigma_t = 3\sigma_0$. From the formula it is evident also that when $\rho = 45°$ $\sigma_t = \sigma_0$.

From FIG. 3 it is evident that $\sigma_t$ is always zero at the points 21, 22, 23 and 24 and in point of principle thus the most sensitive transducer would be obtained if the angle between the magnetizing device and the indicating device is 60°. This depends on the reluctance changes which occur due to the tensile stress between the points 21 and 24 and between 22 and 23 cooperating with the reluctance changes which occur due to pressure stresses between the points 23 and 24 and between 21 and 22, so that the greatest possible magnetic potential difference across the indicating device is obtained. A consequence of this asymmetrical construction is however that a signal from the indicating device is obtained even at zero stress in the material, but this signal can be compensated in the magnetic way in the transducer by bodies of magnetic material being inserted between the points 21 and 22 and between 23 and 24. The compensation can also be carried out electrically in the measuring device. A disadvantage with the oblique-angled construction is however that there is less space for the coils.

If the magnetizing device and the indicating device are placed at right angles to each other, there will be the greatest possible space for the coils and the smallest possible signal at zero stress, but on othe other hand the transducer is a little less sensitive. Usually however the output signal is so strong that the said disadvantage does not matter.

In FIG. 4 another embodiment of the transducer is shown. FIG. 4a shows the magnetizing device with a core in the shape of an H and with the exciting coil 31 arranged on the horizontal part 32 and connected to an A.C. source 14. The two core legs directed downwards 33, are considerably longer than the two core legs directed upwards 34. The indicating device is shown in FIG. 4b. This core is shaped in exactly the same way as the core of the magnetizing device but turned upside down. The measuring coil 35 is connected to the measuring device 15. FIG. 4c shows how the two cores with their coils are combined to a complete transducer and FIG. 4d shows the transducer seen from above in a horizontal cross section along the line A—A in FIG. 4c.

The transducer is thus composed of two exactly equal parts, the two parts not being connected to each other. It is therefore possible during the joining together of the two transducer parts to determine the angle which is desired between the magnetizing device and the indicating device. Further, an important advantage with separated magnetizing and indicating devices is that the inner magnetic connection is practically eliminated, which to a great extent should reduce the influence of possible eccentricities on the zero point voltage.

With both types of transducers the magnetizing device and the indicating device are cast into a cylindrical body of synthetic resin which is then ground to a well defined diameter so that the least possible air gap occurs between the iron cores and the surface of the bore. In order to keep the transducer fixed in the bore, the transducer is provided at each end with a ring of elastic material which is situated in a groove around the transducer. The rings also form an effective sealing and prevent foreign and damaging substances from entering the space between the transducer and the bore.

During the casting of the transducer in the synthetic resin suitably two or four threaded holes are manufactured which are symmetrically situated near the surface of the transducer with their longitudinal direction parallel to the longitudinal direction of the transducer. In these holes bodies of magnetic material, suitably iron screws, can then be screwed in for calibrating the transducer. This is particularly desirable if the material in which the bore is placed is laminated. Such a material is usually anisotropic, so that the transducer gives an output signal even if the stress is zero. With the proposed device an unbalance caused by the anisotrophy can to a substantial extent be compensated.

The transducer according to the invention can be considered as a magnetic bridge where the magneto-motive force is connected into the diagonal which consists of the magnetizing device, while the measuring device is connected into the diagonal which consists of the indication device. The branches of the bridge consist of the four parts of the bore wall which lie between the ends of the iron cores in the magnetizing device and the indicating device. When the mechanical stress in the material is zero and the material is isotropic, the bridge is in balance and the output voltage is zero. If, on the other hand, the material is subjected to mechanical stress, the permeability will increase in two branches and decrease in two, which means that the bridge will be in unbalance.

The principal difference between the transducers mentioned in the introduction and the transducer according to the invention is that the latter is not connected to inhomogeneous magnetic fields, but the transducer can with advantage be made just as long as the thickness of the object to be measured, so that the homogeneous magnetix flux is obtained across the complete width of the material. Thus, a much greater effective measuring surface is obtained, which of course entails a corresponding increase of measuring effect and sensitivity.

We claim:

1. Transducer for determining mechanical stresses in magneto-strictive material and intended to be placed in a bore in the magneto-strictive material at right angles to the stress direction, which transducer comprises a magnetizing device connected to an A.C. source, and an indicating device connected to a measuring or indicating means, the magnetizing device including means to generate a substantially homogeneous magnetic flux in the surface of the bore at diametrically opposite points thereof, which magnetic flux is substantially at right angles to the longitudinal direction of the bore, and the indicating device including means to indicate the magnetic potential difference caused by the mechanical stresses in the material between two zones in the wall of the bore which are substantially diametrically opposite and parallel to the longitudinal direction of the bore.

2. Transducer according to claim 1, comprising a core which is formed as a cross, said generating means comprising an exciting coil mounted on at least one of the two cross arms extending in the same direction, said measuring means comprising a measuring coil mounted on at least one of the remaining cross arms.

3. Transducer according to claim 1, the core forming a right-angled cross.

4. Transducer according to claim 1, having two exciting and two measuring coils arranged on the core.

5. Transducer according to claim 1, said magnetizing device and said indicating device each including an iron core in the form of an H and said generating and measuring means each including a coil arranged on the transverse part of the H.

6. Transducer according to claim 5, each iron core having two vertical core legs situated on one side of the transverse part longer than the two vertical core legs situated on the opposite side of the transverse part.

7. Transducer according to claim 6, the longer core legs of each of the cores enclosing the transverse part of the other core.

8. Transducer according to claim 7, the cores being arranged at right angles to each other.

9. Transducer according to claim 7, the cores forming an angle of 60° with each other.

References Cited

FOREIGN PATENTS 718,194  9/1965  Canada.
1,347,304  11/1963  France.

RICHARD C. QUEISSER, *Primary Examiner.*

CHARLES A. RUEHL, *Examiner.*